United States Patent
Wu et al.

(10) Patent No.: US 9,200,148 B2
(45) Date of Patent: Dec. 1, 2015

(54) CONTROLLED DEGRADATION FIBERS

(75) Inventors: Yong K. Wu, Woodbury, MN (US); Michael D. Crandall, North Oaks, MN (US); Rudolf J. Dams, Antwerp (BE); Michelle M. Hewitt, Inver Grove Heights, MN (US); Ignatius A. Kadoma, Cottage Grove, MN (US); Siegmund Papp, Woodbury, MN (US); Jay M. Jennen, Forest Lake, MN (US); Sasha B. Myers, Arden Hills, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 346 days.

(21) Appl. No.: 13/994,305

(22) PCT Filed: Dec. 8, 2011

(86) PCT No.: PCT/US2011/063930
§ 371 (c)(1),
(2), (4) Date: Jun. 14, 2013

(87) PCT Pub. No.: WO2012/082517
PCT Pub. Date: Jun. 21, 2012

(65) Prior Publication Data
US 2013/0274385 A1 Oct. 17, 2013

Related U.S. Application Data

(60) Provisional application No. 61/423,259, filed on Dec. 15, 2010.

(51) Int. Cl.
*C08L 1/12* (2006.01)
*C08L 1/14* (2006.01)
*D01F 8/02* (2006.01)
*D01F 8/12* (2006.01)
*D01F 6/88* (2006.01)

(52) U.S. Cl.
CPC ... *C08L 1/14* (2013.01); *D01F 6/88* (2013.01); *D01F 8/02* (2013.01)

(58) Field of Classification Search
CPC ......... C08L 1/14; C08L 1/12; C08L 2201/06; D01F 8/02; D01F 8/12
USPC .............................. 524/500, 41, 243; 264/211
See application file for complete search history.

(56) References Cited

U.S. PATENT DOCUMENTS

| 4,427,584 | A | 1/1984 | Legrand et al. |
|---|---|---|---|
| 5,599,776 | A | 2/1997 | Burts et al. |
| 6,016,879 | A | 1/2000 | Burts et al. |
| 6,207,755 | B1 | 3/2001 | Tsai et al. |
| 6,323,158 | B1 | 11/2001 | Burts et al. |
| 6,420,027 | B2 | 7/2002 | Kimura et al. |
| 6,630,429 | B1 | 10/2003 | Cremeans et al. |
| 6,790,812 | B2 | 9/2004 | Halliday et al. |
| 6,902,002 | B1 | 6/2005 | Chatterji et al. |
| 6,976,537 | B1 | 12/2005 | Verret |
| 7,275,596 | B2 | 10/2007 | Willberg et al. |
| 7,278,804 | B2 | 10/2007 | Deal et al. |
| 7,297,662 | B2 | 11/2007 | Verret |
| 7,612,021 | B2 | 11/2009 | Chatterji et al. |
| 2001/0016258 | A1* | 8/2001 | Kimura et al. ............... 428/373 |
| 2003/0158045 | A1 | 8/2003 | Jarrett |
| 2005/0225002 | A1 | 10/2005 | Manner et al. |
| 2006/0157244 | A1 | 7/2006 | Reddy et al. |
| 2009/0321142 | A1 | 12/2009 | Dempsey et al. |

FOREIGN PATENT DOCUMENTS

| CN | 1743516 | 3/2006 |
|---|---|---|
| CN | 1760412 | 4/2006 |
| CN | 101418478 A | 8/2006 |
| CN | 101428995 A | 5/2009 |
| CN | 101671155 A | 3/2010 |
| CN | 101733088 A | 6/2010 |
| EP | 0646620 A1 | 4/1995 |
| EP | 2085447 A1 | 8/2009 |
| EP | 2196516 A1 | 6/2010 |
| JP | 57212231 A | 12/1982 |
| JP | 09105020 A | 4/1997 |
| JP | 09208714 A | 8/1997 |
| JP | 2000054228 A | 2/2000 |
| JP | 2004099677 A | 4/2004 |
| JP | 2006083498 A | 3/2006 |
| KR | 20020087077 A | 11/2002 |
| KR | 10-0504214 B | 7/2005 |
| WO | WO 96/17994 A1 | 6/1996 |
| WO | WO 2004101704 A1 | 11/2004 |
| WO | WO 2006/079779 A1 | 8/2006 |
| WO | WO 2007/010237 A1 | 1/2007 |
| WO | WO 2010019535 A2 | 2/2010 |

OTHER PUBLICATIONS

Krisyuk, V. E., et al., "Kinetics of the Mechanically Activated hydrolysis of Oriented Polyamide-6", Polymer Science U.S.S.R., vol. 31, No. 2, 1989, pp. 360-366.
Ochi, Shinji, "Mechanical properties of kenaf fibers and kenaf/PLA composites", Mechanics of Materials, vol. 40, pp. 446-452, 2008.

* cited by examiner

*Primary Examiner* — Ling Choi
*Assistant Examiner* — Ronald Grinsted
(74) *Attorney, Agent, or Firm* — C. Michael Geise

(57) ABSTRACT

There is provided a controlled degradation fiber and methods of making such controlled degradation fiber, wherein at least one first material and at least one second material are selected such that the fiber has a weight loss of greater than 6 wt. % and less than 60 wt. % based on the total weight of the fiber after one week at 130° C. in the presence of water.

10 Claims, No Drawings

CONTROLLED DEGRADATION FIBERS

The present disclosure relates to controlled degradation fibers. The present disclosure also relates to methods of making and using self-degrading fibers.

BACKGROUND

Degradable materials have been used in various subterranean applications because of their ability to degrade and leave voids, temporarily restrict the flow of a fluid, and/or produce desirable degradation products. Poly(lactic acid) ("PLA") has been used a degradable material because it degrades in subterranean environments after performance of a desired function or because its degradation products may perform a desired function, such as, for example, degrading an acid soluble component or controlling fluid losses. Control of fluid losses, or lost circulation, allows drilling to continue while keeping the wellbore full, preventing an influx of gas or fluid into the wellbore, which can lead to a blowout. Lost circulation occurs when a bit used for drilling operation encounters natural fissures, fractures or caverns, and mud flows into the newly available space. Lost circulation may also be caused by applying more mud pressure (that is, drilling overbalanced) on the formation than it is strong enough to withstand, thereby opening up a fracture into which mud flows.

Controlling the degradation of the degradable material, particularly to achieve control of fluid losses, is important. For instance, a diverting agent formed from a solid particulate degradable material would be of little or no use if it degraded too quickly when placed in a portion of a subterranean formation from which diversion was desired. There exists a need for relatively low-cost controlled degradation fibers for which is it possible to control degradation in various applications.

SUMMARY

In one aspect, the present disclosure provides a controlled degradation fiber comprising: (a) at least one first material, and (b) at least one second material, wherein the first and second materials are selected such that the fiber has a weight loss of greater than 10 wt % based on the total weight of the fiber and less than 60 wt % based on the total weight of the fiber after one week at 130° C. in the presence of water.

In another aspect, the present disclosure provides such controlled degradation fibers further comprising a plasticizer.

In still another aspect, the present disclosure provides a method of making at least one controlled degradation fiber comprising: (a) providing a first material; (b) providing a second material; (c) combining the first material and the second material in an extruder; (d) heating the mixture of the first material and the second material; and (e) extruding the mixture through a die head to form the at least one controlled degradation fiber, wherein the at least one controlled degradation fiber has a degradation level of at least 6 wt % based on the total weight of the fiber and less than 60 wt % based on the total weight of the fiber after one week at 130° C. in the presence of water.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term:

"a", "an", and "the" are used interchangeably and mean one or more; and "and/or" is used to indicate one or both stated cases may occur, for example A and/or B includes, (A and B) and (A or B). Also herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.).

"Self-contained fiber" means a fiber composition with no additional additives or coatings, such as, for example, encapsulants.

"Crystalline" as used in combination with polymers herein means polymers having a distinct melting point.

"Amorphous" as used in combination with polymers herein means non crystalline in that non crystalline compounds do not have a melting point, or at least no distinct melting point.

"Oligomer" means any compound having at least 4 repeating units of the same or different structure or chemical composition having up to 1000 repeating units of the same or different structure or chemical composition.

"Polymer" means any compound having at least 1000 repeating units of the same or different structure or chemical composition.

"Copolymer" means a polymer that is derived from two or more monomeric species, including for example terpolymers, tetramers, and the like.

"Plasticizer" means any low molecular weight material that is miscible and compatible with a blend of the presently disclosed first and second materials.

The first material used in the present disclosure includes, for example, degradable oligomers and polymers, and combinations thereof. For example, any polyamide or blend of polyamides can be used as the first material provided that they, alone or in combination, produce a fiber weight loss of greater than 6 wt % based on the total weight of the fiber and less than 60 wt % based on the total weight of the fiber after one week at 130° C. in the presence of water when prepared as a fiber with the presently disclosed second material. Exemplary degradable materials include cellulose acetate, cellulose acetate esters, nylon 6,10, nylon 6,12, co-polymers of polyamide 6,6 and polyamide 6, polyamide 6,6, polyamide 6, polycarbonate, and the like, and combination thereof. Fillers or other additives, such as, for example, particulate or fibrous fillers, may also be added to the first material.

When selecting the first material, the self-degradation rate of the controlled degradation fiber and the resulting degradation products should be considered. Selection of the first material may depend, at least in part, on the conditions under which the controlled degradation fiber made therefrom will be used. For example, moisture, temperature, pressure, oxygen, microorganisms, enzymes, pH, and the like, may impact the degradation of the first material and, thus, the degradation level of the controlled degradation fibers made therefrom.

The second material used in the present disclosure can be a monomer, an oligomer, a polymer, or blends thereof. Exemplary monomers useful in the presently disclosed second material include lactide, glycolide, and the like, and combinations thereof. Exemplary oligomers useful in the presently disclosed second material include oligomers of lactic acids, oligomers of glycolic acids, co-oligomers of lactic and glycolic acids. In addition, these exemplary co-oligomers may be made with other functional monomers, such as, for example,

[epsilon]-caprolactone, 1,5-dioxepan-2-one, trimethylene carbonate, or other suitable monomers to obtain an oligomer with a degradation rate different than that of the first material. Exemplary materials useful as the presently disclosed second material include oligomeric co-polymers of lactic and glycolic acids, amine terminated polypropylene glycol, polylactic acid, and combinations thereof. The second material used in the present disclosure can be acidic or basic.

In some embodiments, the present disclosure also provides a third material. In some embodiments, the third material is a plasticizer. Plasticizers useful as the presently disclosed third material include, but are not limited to, polyethylene glycol; polyethylene oxide; citrate esters (such as tributyl citrate oligomers, triethyl citrate, acetyltributyl citrate, acetyltriethyl citrate); glucose monoesters; partially fatty acid esters; PEG monolaurate; triacetin; poly([epsilon]-caprolactone); poly (hydroxybutyrate); glycerin-1-benzoate-2,3-dilaurate; glycerin-2-benzoate-1,3-dilaurate; starch; bis(butyl diethylene glycol)adipate; glycerine diacetate monocaprylate; diacetyl monoacyl glycerol; polypropylene glycol (and epoxy, derivatives thereof); polypropylene glycol)dibenzoate, dipropylene glycol dibenzoate; glycerol; ethyl phthalyl ethyl glycolate; poly(ethylene adipate)distearate; di-iso-butyl adipate; diethyl phthalate, p-toluene ethyl sulfonamide, triphenyl phosphate, triethyl tricarballylate, methyl phthallyl ethyl glycolate, sucrose octaacetate, sorbitol hexaacetate, mannitol hexaacetate, pentaerythritol tetraacetate, triethylene diacetate, diethylene dipropionate, diethylene diacetate, tributyrin, tripropionin, and combinations thereof. In some embodiments, the plasticizer is selected based on its compatibility with the first and second materials and based on the conditions under which the controlled degradation fibers will be used. For example, in some embodiments, the plasticizer is selected such that it has the same solubility as the first material when used in a particular drilling fluid.

In some embodiments, the presently disclosed controlled degradation fibers also include additional modifiers and other additives, such as, for example, natural fillers, processing aid/dispersants, nucleants, compatibilizers, thermal stabilizers, and the like, and combinations thereof. Natural fillers useful in the present disclosure include lignocellulosic fillers, such as, for example, starches, and the like. Other useful fillers include micronized talc and calcium carbonate. Processing aid/dispersant can be used in the presently disclosed controlled degradation fibers. Exemplary, processing aid/dispersants useful in the present disclosure include compositions with thermoplastics, such as that available under the trade designation "Struktol" (commercially available from Struktol Company of America).

Nucleants, such as, for example boron nitride or a nucleant available under the trade designation "HPN" (commercially available from Milliken) are another type of additive that can be added to the presently disclosed controlled degradation fibers. Compatibilizers are another category of additives that can be used in the present disclosure. Exemplary compatibilizers include polyolefin functionalized or grafted with anhydride maleic; ionomer based on copolymer ethylene-acrylic acid or ethylene-methacrylic acid neutralized with sodium (such as those available under the trade designation "Surlyn" from DuPont). Other additives useful in the present disclosure include thermal stabilizers, such as, for example, primary antioxidant and secondary antioxidant, pigments; ultraviolet stabilizers of the oligomeric HALS type (hindered amine light stabilizer).

Controlled degradation fibers according to the present disclosure degrade, both chemically and physically. Without wishing to be bound by theory, it is believed that the second material behaves as a degradation additive and initiates the degradation process by catalyzing the hydrolysis of the first material.

The first and second materials can be processed like most thermoplastics into controlled degradation fibers (for example using conventional melt spinning processes) and film. In some embodiments, the controlled degradation fiber is produced directly by drawing reactive monomers to make the fibers. In some embodiments, the first and second material are be combined, such as for example in pellet form, in various weight ratios or weight percents. In one embodiment, the first material is present in a major amount. In one embodiment the weight percent of the first material based on the total weight of the self-degradable fiber is greater than or equal to 50 weight percent, greater than 60 weight percent, greater than 70 weight percent, greater than 80 weight percent, greater than 90 weight percent, or even greater than or equal to 95 weight percent. In some embodiments, the weight percent of the first material based on the total weight of the self-degradable fiber is greater than or equal to 50 weight percent and less than or equal to 99 weight percent. In one embodiment, the second material is present in a minor amount. In one embodiment the weight percent of the second material based on the total weight of the self-degradable fiber is less than 50 weight percent, less than 40 weight percent, less than 30 weight percent, less than 20 weight percent, less than 10 weight percent, or even less than or equal to 5 weight percent. In some embodiments, the weight percent of the second material based on the total weight of the self-degradable fiber is less than 50 weight percent and greater than or equal to 1 weight percent.

In one embodiment, the first material and second material are combined in an extruder, such as for example a 25 mm twin screw extruder (commercially available under the trade designation "Ultraglide" from Berstorff, Hannover, Germany). The extruder is then heated depending on the type of materials selected for use as the first and second material. For example, in one embodiment the extruder is heated to temperatures ranging from about 200° C. to about 270° C.

Controlled degradation fibers are then prepared by extruding the heated material through a die. For example, a 0.05 cm diameter die with a 64-filament orifice and 4:1 length/diameter ratio can be used on a 19 mm single screw extruder (commercially available from Killion Laboratories, Houston, Tex.). The die and single screw extruder are typically run at a temperature above ambient conditions depending on the specific materials selected for use as the first and second material. In one embodiment, the die and single extruder are run at a temperature ranging from about 200° C. to about 270° C.

Once extruded, the resulting controlled degradation fibers are cooled and drawn. Cooling can be done under ambient conditions using air or by using any known cooling techniques. Drawing can be done at various roll speeds depending on the selection of first and second materials and the desired resulting diameter of the controlled degradation fibers. For example, in some embodiments, a roll speed of 250 m/min was used. In some embodiments, a roll speed of 750 m/min was used.

The presently disclosed controlled degradation fibers are useful as effective bridging agents in nature fractures to divert fluid flow, and to stop the fluid loss. Typically fibers used to treat lost circulation in a hydrocarbon producing zone require them to be stable for several weeks, preferably 2 to 3 weeks at the down hole temperatures until the well completion is done. After the completion, these fibers should gradually degrade, either mechanically or chemically, to allow the fracture be reopened for oil or gas production. Presently commercially available fibers are either too stable to allow fractures to reopen, or too unstable that they degrade before well completion. The presently disclosed controlled degradation fibers provide controlled degradation rates and have degradation products that are compatible with down hole brine.

Controlled degradation fibers according to the present disclosure may be used in any subterranean application wherein it is desirable for the controlled degradation fibers to degrade, e.g., to leave voids, act as a temporary restriction to the flow of a fluid, or produce desirable degradation products. In some embodiments, controlled degradation fibers according to the present disclosure are useful for subterranean applications including, but not limited to, cementing (such as, for example, regular or acid soluble cement compositions), fracturing, or gravel packing applications. In some embodiments, the presently disclosed controlled degradation fibers are used in conjunction with hydraulic cement compositions and their associated applications, including, but not limited to, primary cementing, sand control, and fracturing. Controlled degradation fibers according to the present disclosure may also be used in sand control applications in a permeable cement composition. Controlled degradation fibers according to the present disclosure are also useful in fracturing applications, either in conjunction with any suitable fracturing fluid, including a conventional fracturing fluid that includes a base fluid and a viscosifying agent or a fracturing fluid that comprises a cement composition. The presently disclosed controlled degradation fibers are also useful in a fracturing operation that does not involve a cement composition to form a proppant pack in a fracture having voids to increase its permeability. Controlled degradation fibers according to the present disclosure may also be incorporated within a gravel pack composition so as to form a gravel pack down hole that provides some permeability from the degradation of the controlled degradation fibers.

Following are exemplary embodiments of the present disclosure:

Embodiment 1

A controlled degradation fiber comprising:
(a) at least one first material, and
(b) at least one second material,
wherein the first and second materials are selected such that the fiber has a weight loss of greater than 6 wt % based on the total weight of the fiber and less than 60 wt % based on the total weight of the fiber after one week at 130° C. in the presence of water.

Embodiment 2

The controlled degradation fiber of embodiment 1 further comprising:
(c) a plasticizer.

Embodiment 3

The controlled degradation fiber of embodiment 2 wherein the plasticizer is selected from polyethylene glycol; polyethylene oxide; citrate esters; triethyl citrate; acetyltributyl citrate; acetyltriethyl citrate; glucose monoesters; partially fatty acid esters; PEG monolaurate; triacetin; poly([epsilon]-caprolactone); poly(hydroxybutyrate); glycerin-1-benzoate-2,3-dilaurate; glycerin-2-benzoate-1,3-dilaurate; starch; bis (butyl diethylene glycol)adipate; glycerine diacetate monocaprylate; diacetyl monoacyl glycerol; polypropylene glycol; polypropylene glycol)dibenzoate, dipropylene glycol dibenzoate; glycerol; ethyl phthalyl ethyl glycolate; poly(ethylene adipate)distearate; di-iso-butyl adipate; diethyl phthalate; p-toluene ethyl sulfonamide; triphenyl phosphate; triethyl tricarballylate; methyl phthallyl ethyl glycolate; sucrose octaacetate; sorbitol hexaacetate; mannitol hexaacetate; pentaerythritol tetraacetate; triethylene diacetate; diethylene dipropionate; diethylene diacetate; tributyrin; tripropionin; and combinations thereof.

Embodiment 4

The controlled degradation fiber of any preceding embodiment wherein the weight loss occurs at a starting pH of between 6 and 8.

Embodiment 5

The controlled degradation fiber of any preceding embodiment wherein the first material is selected from cellulose acetate; cellulose acetate esters; nylon 6,10; nylon 6,12; polyamide 6,6; polyamide 6; or polycarbonate.

Embodiment 6

The controlled degradation fiber of any preceding embodiment wherein the first material is a blend of at least two materials selected from cellulose acetate; cellulose acetate esters; polyamide 6,6; polyamide 6; or polycarbonate.

Embodiment 7

The controlled degradation fiber of any preceding embodiment wherein the second material is selected from oligomeric co-polymers of lactic and glycolic acids, amine terminated polypropylene glycol, polylactic acid, and combinations thereof.

Embodiment 8

The controlled degradation fiber of any preceding embodiment wherein the fiber is a self-contained fiber.

Embodiment 9

A method of making at least one controlled degradation fiber comprising:
(a) providing a first material;
(b) providing a second material;
(c) combining the first material and the second material in an extruder;
(d) heating the mixture of the first material and the second material; and
(e) extruding the mixture through a die head to form the at least one controlled degradation fiber, wherein the at least one controlled degradation fiber has a degradation level of at least 6 wt % based on the total weight of the fiber and less than 60 wt % based on the total weight of the fiber after one week at 130° C. in the presence of water.

Embodiment 10

The method of embodiment 9 wherein the first material comprises greater than equal to 50 wt % of the total weight of the fiber and less than equal to 99 wt % of the total weight of the fiber.

Embodiment 11

The method of embodiment 9 or 10 wherein the second material comprises greater than equal to 1 wt % of the total weight of the fiber and less than 50 wt % of the total weight of the fiber.

Embodiment 12

The method of embodiment 9, 10 or 11 further comprising: (c) a plasticizer.

Embodiment 13

The method of embodiment 12 wherein the plasticizer is selected from polyethylene glycol; polyethylene oxide; citrate esters; triethyl citrate; acetyltributyl citrate; acetyltriethyl citrate; glucose monoesters; partially fatty acid esters; PEG monolaurate; triacetin; poly([epsilon]-caprolactone); poly(hydroxybutyrate); glycerin-1-benzoate-2,3-dilaurate; glycerin-2-benzoate-1,3-dilaurate; starch; bis(butyl diethylene glycol)adipate; glycerine diacetate monocaprylate; diacetyl monoacyl glycerol; polypropylene glycol; polypropylene glycol)dibenzoate, dipropylene glycol dibenzoate; glycerol; ethyl phthalyl ethyl glycolate; poly(ethylene adipate)distearate; di-iso-butyl adipate; diethyl phthalate; p-toluene ethyl sulfonamide; triphenyl phosphate; triethyl tricarballylate; methyl phthallyl ethyl glycolate; sucrose octaacetate; sorbitol hexaacetate; mannitol hexaacetate; pentaerythritol tetraacetate; triethylene diacetate; diethylene dipropionate; diethylene diacetate; tributyrin; tripropionin; and combinations thereof.

Embodiment 14

The method embodiment 9, 10, 11, 12 or 13 wherein the weight loss occurs at a starting pH of between 6 and 8.

Embodiment 15

The method of embodiment 9, 10, 11, 12, 13 or 14 wherein the first material is selected from cellulose acetate; cellulose acetate esters; nylon 6,10; nylon 6,12; polyamide 6,6; polyamide 6; or polycarbonate.

Embodiment 16

The method of embodiment 9, 10, 11, 12, 13, 14 or 15 wherein the first material is a blend of at least two materials selected from cellulose acetate; cellulose acetate esters; polyamide 6,6; polyamide 6; or polycarbonate.

Embodiment 17

The method of embodiment 9, 10, 11, 12, 13, 14, 15 or 16 wherein the second material is selected from oligomeric copolymers of lactic and glycolic acids, amine terminated polypropylene glycol, polylactic acid, and combinations thereof.

Embodiment 18

The method of embodiment 9, 10, 11, 12, 13, 14, 15, 16 or 17 wherein the fiber is a self-contained fiber.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

These abbreviations are used in the following examples: g=gram, min=minutes, in=inch, m=meter, cm=centimeter, mm=millimeter, ml=milliliter, and mmHg=millimeters of mercury.

The following materials were used in Comparative Examples A-C, and Examples 1-4:

First Material

"380A4000010" or "TP 380-10": cellulose acetate propionate with a density of 1.2 g/cm$^3$ commercially available from Eastman Chemical, Kingsport, Tenn.

"ULTRAMID B24 N01": nylon-6 polymer commercially available from BASF, Ludwigschaffen, Germany.

Second Material

"PLA 4060": amorphous polylactic acid commercially available from NatureWorks, Minnetonka, Minn.

"JEFFAMINE D2000": amine terminated polypropylene glycol commercially available from Huntsman Chemical, Salt Lake City, Utah.

Oligomeric copolymer of lactic and glycolic acids (75/25 mole percent) (OLGA) prepared according to the following description: approximately 106.2 g of an aqueous solution of lactic acid (commercially available from ADM, Decatur, Ill.) and 37.6 g of glycolic acid (commercially available from DuPont, Wilmington, Del.) were added to a 250 ml reactor. Approximately 24 g of water was distilled off at a temperature of 55° C. and vacuum of 50 mmHg. After, the batch temperature was risen to 125° C. and the reaction was kept under these conditions 4 hours. Nitrogen was purged into the mixture and a sample was drawn out for titration with 0.5 N Potassium Hydroxide (KOH) in methanol. When a titration value of 350 g/equivalent was reached, the reaction was stopped and the OLGA material was removed from the reactor.

Comparative Example A

Comparative Example A is the fiber described in Example 1 of U.S. Pat. No. 7,275,596 (Willberg), incorporated herein by reference. Accordingly, the fiber comprises polylactic acid containing about 87 weight % polylactide, about 12 weight % water, and about 1 weight % sizing. The material was a poly lactic acid commercially available under the trade designation "NatureWorks PLA 6201D" or "NatureWorks PLA 6202D", made into a fiber of average length about 5.7 to 6.3 mm, and denier about 1.35 to about 1.45. It was found that the degradation rate is about the same for 6201D and 6202D. It can be seen that the fiber decomposes in about 1 day at 121° C. and at about 2 months at 79.4° C. The fiber described in this example has an expected downhole life of about 5 to 6 hours at a pH of 6 to 7 at 121° C. Per FIG. 1 of U.S. Pat. No. 7,275,596, the fiber has a percent weight loss of more than 70% after 7 days at 130° C.

Comparative Example B

Pellets of ULTRAMID B24 NO1 were obtained and are hereinafter referred to as Comparative Example B.

Comparative Example C

Pellets of TP 380-10 were obtained and are hereinafter referred to as Comparative Example C.

Example 1

Controlled degradation pellets were prepared by blending first and second materials in the 25 mm twin screw extruder (model "Ultraglide" commercially available from Berstorff, Hannover, Germany). Pellets of TP 380-10 (first material) were dried overnight at a drying temperature of 80° C. and fed to the twin screw extruder. OLGA (second material) was added downstream as a liquid additive at a mixing speed of 180 rpm. A molten strand of the controlled degradation material was drawn through cold water and cut into cylindrical pellets. The controlled degradation pellets were dried overnight at 77° C. under vacuum.

Controlled degradation fiber (Example 1) was prepared by adding controlled degradation pellets into a 19 mm single screw extruder (commercially available from Killion Laboratories, Houston, Tex.). The single screw extruder was equipped with a 0.05 cm diameter die having a 64-filament orifice and 4:1 length/diameter ratio. The die and single screw extruder were heated to 200 to 270° C. The fibers were air cooled and drawn at a roll speed of 250 m/min. The number average diameter of the resulting fibers was in the range of 0.020 mm to 0.025 mm.

Example 2

A controlled degradation fiber was prepared as described in Example 1, except that the TP 380-10/OLGA weight ratio was 99/1.

Example 3

A controlled degradation fiber was prepared as described in Example 1, except that the PLA 4060 was used as a second material. The TP 380-10/PLA 4060 weight ratio was 95/5.

Example 4

A controlled degradation fiber was prepared as described in Example 4, except that the ULTRAMID B24 N01/JEFFAMINE D2000 weight ratio was 95/5.

A summary of Comparative Examples A-C, and Examples 1-4 is shown in Table 1, below.

TABLE 1

Summary of Comparative Examples A-C, and Examples 1-4.

| Example | First Material | Second Material | Weight ratio (first/second material) |
|---|---|---|---|
| Comparative Example A | PLA 6201D OR PLA 6202D | None | — |
| Comparative Example B | ULTRAMID B24 N01 | None | — |
| Comparative Example C | TP 380-10 | None | — |
| Example 1 | TP 380-10 | OLGA | 95/5 |
| Example 2 | TP 380-10 | OLGA | 99/1 |
| Example 3 | TP 380-10 | PLA 4060 | 95/5 |
| Example 4 | ULTRAMID B24 N01 | JEFFAMINE D2000 | 95/5 |

Degradation rate of fibers prepared as described in Comparative Examples A-C and Examples 1-4 was measured according to the following procedure: Approximately 1 g of fibers and 100 grams of deionized (DI) water were added to separate containers. The initial pH was measured to be 6.0 for all fiber mixtures. The containers were shaken to homogenize the dispersion and subsequently placed in a convection oven set at a testing temperature of 130° C. for 1 and 7 aging days. After aging, water was drained from the containers through a glass frit filter (using a porosity C fritted disk with 25-50 micron pore size commercially available from Ace Glass Company, Inc. Vineland, N.J.) and the fibers were dried at 49° C. for approximately 3 hours. The fibers were removed from the oven and allowed to cool at room conditions before being weighed. Percent weight loss was then calculated. Percent weight loss for fibers prepared as described in Comparative Examples A-C and Examples 1-4 at different aging days is shown in Table 2, below.

TABLE 2

Percent weight loss at 130° C. after 1 and 7 aging days.

| | Weight loss at 130° C. (%) | |
|---|---|---|
| Examples | 1 day | 7 days |
| Comparative Example A | N/A | >70 |
| Comparative Example B | 4.44 | 5.68 |
| Comparative Example C | 0.09 | 4.0 |
| Example 1 | 7.30 | 22.85 |
| Example 2 | 2.63 | 6.57 |
| Example 3 | 7.84 | 32.60 |
| Example 4 | 7.68 | 12.34 |

Various modifications and alterations of this invention will become apparent to those skilled in the art without departing from the scope and spirit of this invention.

What is claimed is:

1. A controlled degradation fiber comprising:
    (a) at least one first material, and
    (b) at least one second material,
    wherein the first and second materials are selected such that the fiber has a weight loss of greater than 6 wt. % and less than 60 wt. % based on the total weight of the fiber after one week at 130° C. in the presence of water,
    wherein the first material is selected from cellulose acetate, cellulose acetate esters, nylon 6,10, nylon 6,12, polyamide 6,6, polyamide 6, and polycarbonate,
    wherein the second material is selected from oligomeric co-polymers of lactic and glycolic acids, amine terminated polypropylene glycol, polylactic acid, and combinations thereof, and
    wherein the first material comprises greater than or equal to 50 wt. % of the total weight of the fiber and less than or equal to 99 wt. % of the total weight of the fiber.

2. The controlled degradation fiber of claim 1 further comprising:
    (c) a plasticizer.

3. The controlled degradation fiber of claim 2 wherein the plasticizer is selected from polyethylene glycol; polyethylene oxide; citrate esters; triethyl citrate; acetyltributyl citrate; acetyltriethyl citrate; glucose monoesters; partially fatty acid esters; PEG monolaurate; triacetin; poly([epsilon]-caprolactone); poly(hydroxybutyrate); glycerin-1-benzoate-2,3-dilaurate; glycerin-2-benzoate-1,3-dilaurate; starch; bis(butyl diethylene glycol)adipate; glycerine diacetate monocaprylate; diacetyl monoacyl glycerol; polypropylene glycol; polypropylene glycol)dibenzoate, dipropylene glycol dibenzoate; glycerol; ethyl phthalyl ethyl glycolate; poly(ethylene adipate)distearate; di-iso-butyl adipate; diethyl phthalate; p-toluene ethyl sulfonamide; triphenyl phosphate; triethyl tricarballylate; methyl phthallyl ethyl glycolate; sucrose octaacetate; sorbitol hexaacetate; mannitol hexaacetate; pentaerythritol tetraacetate; triethylene diacetate; diethylene dipropionate; diethylene diacetate; tributyrin; tripropionin; and combinations thereof.

4. The controlled degradation fiber of claim 1 wherein the weight loss occurs at a starting pH of between 6 and 8.

5. The controlled degradation fiber of claim 1 wherein the first material is a blend of at least two materials selected from cellulose acetate; cellulose acetate esters; polyamide 6,6; polyamide 6; and polycarbonate.

6. The controlled degradation fiber of claim 1 wherein the fiber is a self-contained fiber.

7. A method of making the controlled degradation fiber according to claim 1 comprising:
(a) providing a first material;
(b) providing a second material;
(c) combining the first material and the second material in an extruder;
(d) heating the mixture of the first material and the second material; and
(e) extruding the mixture through a die head to form the at least one controlled degradation fiber, wherein the at least one controlled degradation fiber has a degradation level of at least 6 wt % based on the total weight of the fiber and less than 60 wt % based on the total weight of the fiber after one week at 130° C. in the presence of water.

8. The method of claim 7 wherein the second material comprises greater than equal to 1 wt % of the total weight of the fiber and less than 50 wt % of the total weight of the fiber.

9. The method of claim 7 wherein the first material is a blend of at least two materials selected from cellulose acetate; cellulose acetate esters; polyamide 6,6; polyamide 6; and polycarbonate.

10. The method of claim 7 wherein the fiber is a self-contained fiber.

* * * * *

UNITED STATES PATENT AND TRADEMARK OFFICE
CERTIFICATE OF CORRECTION

PATENT NO. : 9,200,148 B2
APPLICATION NO. : 13/994305
DATED : December 1, 2015
INVENTOR(S) : Yong Wu et al.

It is certified that error appears in the above-identified patent and that said Letters Patent is hereby corrected as shown below:

In the specification

Column 3
Line 21, Delete "polypropylene glycol)" and insert -- poly(propylene glycol) --, therefor.

Column 5
Line 67, Delete "polypropylene glycol)" and insert -- poly(propylene glycol) --, therefor.

Column 7
Line 22-23, Delete "polypropylene glycol)" and insert -- poly(propylene glycol) --, therefor.

In the claims

Column 10
Line 67, In Claim 3, delete "polypropylene glycol)" and insert -- poly(propylene glycol) --, therefor.

Signed and Sealed this
Nineteenth Day of April, 2016

Michelle K. Lee
*Director of the United States Patent and Trademark Office*